Jan. 15, 1952     A. E. HEIN     2,582,542
COOKY MAKING MACHINE

Filed April 7, 1949     2 SHEETS—SHEET 1

INVENTOR.
August E. Hein.
BY
Harness, Dickey & Pierce
ATTORNEYS.

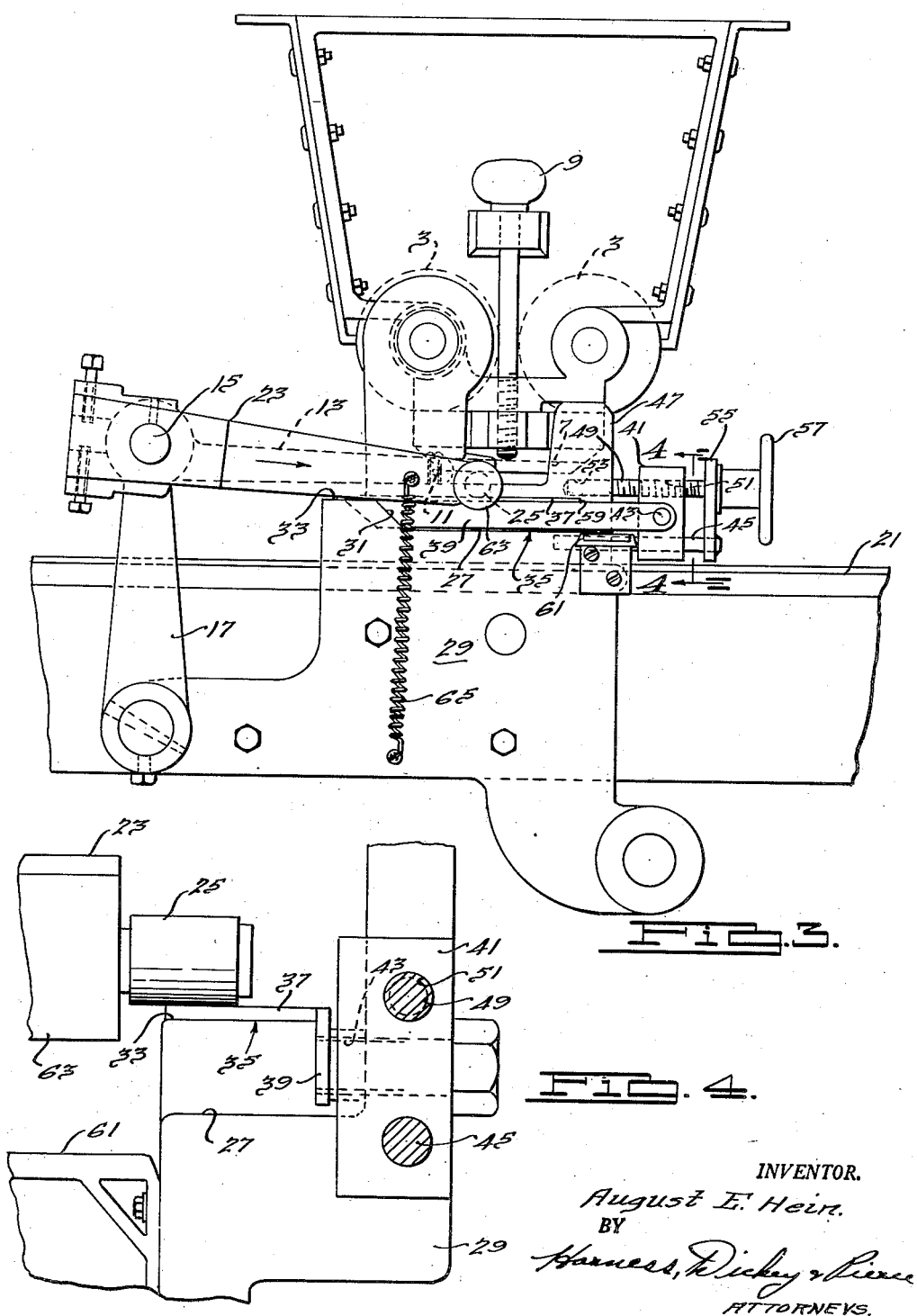

Patented Jan. 15, 1952

2,582,542

UNITED STATES PATENT OFFICE 2,582,542

COOKY MAKING MACHINE

August E. Hein, Cincinnati, Ohio, assignor to The Century Machine Company, Cincinnati, Ohio, a corporation of Ohio Application April 7, 1949, Serial No. 86,077

5 Claims. (Cl. 107—29)

This invention relates to cookie making machines and, in particular, refers to the cutoff mechanisms thereof.

Cookie making machines ordinarily include a set of feed rolls which force cookie dough from a hopper through a die onto an underlying conveyor or pan for delivery to the oven. The die opening shapes the periphery of the dough into a desired form and a reciprocated wire is passed on the underside of the die to slice off dough in pieces of the desired thickness and allow them to drop individually onto the conveyor or pan.

It has been found by experience that the cutoff wire has a tendency to cause improper dropping of the dough pieces so that they flip or turn and land sideways on the conveyor, thus disfiguring them and rendering them unsuitable for sale. This tendency is due partly to sticking of the dough to the wire and also to the fact that the side of the dough piece which is cut first starts to fall before that which is cut last so that under this handicap it is difficult for the dough piece to land flat on the conveyor. In order to combat this tendency, the wire is used to cut in only one direction and, immediately after severing, is moved downwardly so as to facilitate dropping of the dough piece. The precise point at which this downward movement or "drop-off" of the cutting wire occurs is very critical and varies with the dough and with each size die opening. Consequently, in production machines which are used to manufacture various sizes and types of cookies, means must be provided to adjust the wire drop-off point.

Various means have been proposed heretofore for adjusting the wire drop-off point. In the more complex systems the entire reciprocatory stroke of the wire is shiftable. Such systems are, of course, comparatively difficult and expensive to manufacture and many in the art have preferred the simpler expedient of shifting the position of the wire on the support members which carry it. In the latter arrangement the support members are guided on parallel horizontal tracks and the drop off occurs at the end of the stroke at which point the support members drop from the upper to the lower track. By shifting the wire on the support members, the end and drop-off point of the wire is shifted relative to the die.

The present invention is an improvement upon the more simplified structure just described and provides an even simpler yet positive control of the drop off. It has been found that improved control of the drop-off point can be achieved by having the drop-off occur at an intermediate point in the stroke which is adjustable relative to the ends of the stroke. Therefore, in the present device, the wire remains fixed relative to the support members but the end drop-off edge of the upper track is adjusted relative to the end points of the reciprocatory stroke. Thus, in contrast to the principle of the prior art devices, the construction of the present invention does not attempt to adjust the end points or to vary the general reciprocatory stroke of the wire but instead merely adjusts the point in the stroke at which the drop-off occurs, the length of the stroke of the wire and its end points remaining fixed.

As will be evident hereinafter, the mechanism providing this control is simple and direct acting so that accurate regulation of the critical drop-off point is conveniently accomplished.

A preferred form of the invention is shown by way of illustration in the accompanying drawings in which:

Figs. 2 and 3 are side elevations, with parts removed, of the machine of Fig. 1 showing the wire cut-off mechanism in different parts of its stroke; and Fig. 4 is an enlarged view taken on the plane 4—4 of Fig. 3.

Figure 1:
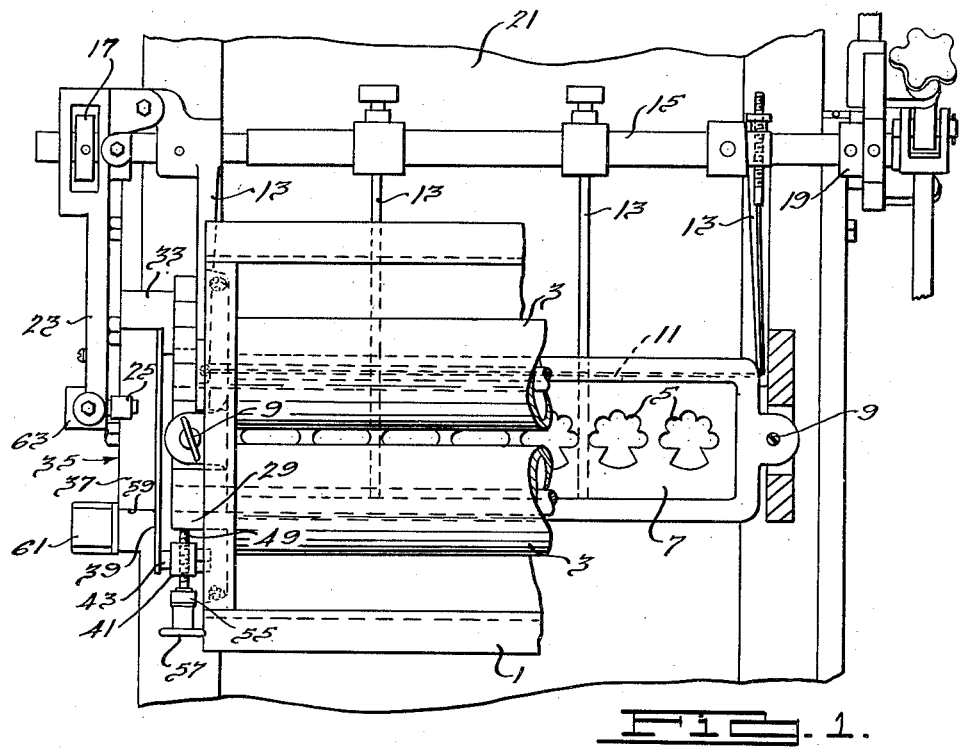
Figure 1 is a plan view, with parts broken away, of a cookie forming machine embodying the invention.

A cookie forming machine of a conventional design is illustrated in the drawings and includes a dough hopper 1 and feed rolls 3 for forcing dough from the hopper through the openings 5 in a die 7 that is attached to the underside of the hopper and feed roll assembly by means of bolts 9.

The cut-off wire 11 is disposed on the underside of the die 7 and may be reciprocated by a conventional shuttle mechanism. Thus, the wire is carried by the ends of several laterally spaced fingers 13 which are secured to the finger shaft 15. The shaft 15 is driven by the crank 17 which may be reciprocated in any desired manner. The shaft 15 is journaled in the crank 17 and also in another movable bearing 19 so that while it and the fingers 13 have reciprocatory movement, they are also capable of pivotal movement. The bearing 19 may, in conventional manner, be carried by a rocker arm (not identified) that is connected through suitable linkage to a motor and which furnishes power to reciprocate the wire 11.

This pivotal movement of the shaft 15 and fingers 13 provides means whereby the wire 11 is dropped at the end of the cutting stroke to combat the tendency of the sliced dough pieces to turn before they strike the conveyor 21 which is disposed beneath the die outlets 5. It is guided by the link or guide arm 23 that is fixed to the finger shaft 15. This arm has a roller 25 at its free end which rides on the novel guide track mechanism of this invention.

This track mechanism includes a lower track 27 which may be the top edge surface of a fixed plate or bracket 29. This track is at least as long as the reciprocatory stroke of the roller 25 and at its forward or left end is upwardly inclined at 31 so that the roller is cammed upwardly. The roller therefore rides onto a short fixed track portion 33 and the shaft 15 is pivoted upwardly so that the wire is substantially in position for cutting upon reciprocatory movement to the right in Figs. 1 and 3. While the roller 25 is on the track 33, its direction of movement is reversed, i. e., the end of the reciprocatory stroke occurs, and the mechanism is driven to the right to sever the dough forced through die openings 5.

The roller 25 and thus the entire wire cut-off mechanism is supported in operative position beneath the die 7 on the cutting or rightward stroke by the upper track 35 which comprises a horizontal portion 37 and a vertical side portion 39. The portion 39 is pivoted at one end to an adjustment block 41 as indicated at 43. This block is slidably mounted on a fixed support rod 45 which is secured to the plate 29. It is moved horizontally on the rod 45 by rotation of a threaded member or shaft 49 which extends through a threaded aperture 51 in the block and is journaled at 53 in the frame 29. The threaded member 49 may also be journaled in a support plate 55 that is fixed to the rod 45 and may be provided with a handle 57 whereby it is manually rotated. The track portion 37 rests on the fixed portion 33 to support the track 35 so that portion 37 is horizontal, i. e., parallel to the bottom surface of the die 7. The horizontal track portion 37 terminates at edge 59 which comprises the drop-off point.

Figure 2:
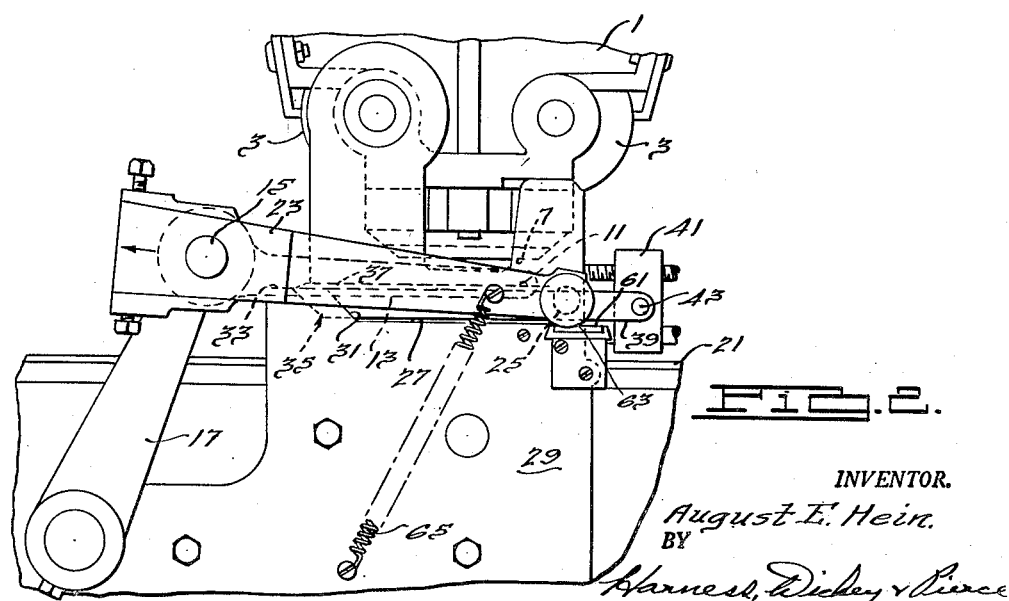

Thus, when the cut-off mechanism moves on its cutting stroke to the right, the roller 25 rides on track 37 until it reaches edge 59. It then drops to the lower, fixed track 27 and this drop may be cushioned by a bumper 61 which is engaged by a boss 63 on the guide arm 23 as shown in Fig. 2. The speed of this drop is increased by a tension spring 65 which is attached at one end to the fixed plate 29 and at its other end to the guide arm 23. The roller 26 then continues the rest of its rightward stroke on track 27, or if the drop-off point 59 happens to coincide with the end of the stroke, it starts to move to the left. In either case, when the roller 25 passes up the incline 31, it engages the underside of the horizontal portion 37 of the track 35. Because of the pivot 43, however, the track 35 moves upwardly to permit the roller to ride on to track 33.

It will be evident that the position of the drop-off edge 59 can be regulated by means of the handle 57. This is a simple and accurate adjustment which does not interfere in any way with the reciprocatory stroke of the cut-off mechanism. Thus, the optimum drop-off point for the wire 11 can be provided. This, in combination with the spring 65, enables the wire 11 to, in effect, at least, catch up with the forward edges of the cookie patties which have been severed so that the patties land flat on the conveyor 21.

Various modifications may, of course, be made without departing from the spirit of the invention, hence it is not intended to limit it to the specific structure illustrated.

What is claimed is:

1. In a cookie making machine or the like having a wire cut-off mechanism, the combination of vertically spaced tracks for guiding reciprocatory motion of the wire, the upper of said tracks being adapted to guide the wire during cutting and its end portion comprising a drop-off point whereat the wire mechanism falls to the lower track, said upper track being movable longitudinally, and means for moving the upper track longitudinally and thereby adjusting the upper track so as to vary the position of its end drop-off portion relative to the end points of the reciprocatory stroke of the wire.

2. In a cookie making machine or the like having a die and a reciprocatory wire cut-off mechanism operatively disposed adjacent the outlet side of the die, the combination of a reciprocatory guide for the wire cut-off mechanism, a fixed track for the guide, a substantially horizontal movable track for the guide, a horizontally movable support member, means pivotally connecting the movable track to the support member, said movable track terminating at a point above the fixed track comprising the drop-off point, and means for horizontally moving the support member to thereby vary the drop-off point.

3. In a cookie making machine or the like having a die and a roller guided wire cut-off mechanism, an adjustable guideway and drop-off point control comprising means for reciprocating the wire mechanism through a stroke of predetermined length, a guide member for the roller for guiding the wire mechanism in juxtaposition to the die on the cutting stroke, means spaced beneath the guide member for further guiding the roller, an end of the guide member comprising a drop-off point from which the roller falls to the guide means, said guide member being shiftable in a direction parallel to said stroke whereby the position of the drop-off point within the stroke may be varied.

4. In a cookie making machine or the like having a die and reciprocatory wire cut-off mechanism, the combination of shiftable means for supporting the wire cut-off mechanism in dough cutting relationship to the die during a portion of the mechanism's reciprocatory movement, lower means beneath the shiftable means for supporting the mechanism during a substantial portion of the balance of the mechanism's reciprocatory movement, said shiftable means having an edge from which the mechanism drops to the lower means, means for adjusting the shiftable means so as to vary the position of said edge within the reciprocatory stroke of the mechanism, and means for guiding and supporting the mechanism to return it from the lower means to the adjustable means.

5. In a cookie machine or the like having a frame and reciprocatory wire cut-off mechanism mounted on the frame, said mechanism including a guide roller, the combination of a track for the roller fixed on said frame and including upper and lower horizontal sections and an upwardly inclined section joining said upper and lower sections, a movable track mounted on the frame and having a horizontal section located over said lower horizontal section of the fixed track and substantially in the plane of the upper section of said fixed track and having one end thereof resting on said upper section, the other end of the horizontal section of said movable track being located above the lower horizontal section of the fixed track and constituting a drop-off point for the roller, a block mounted on the frame for horizontal adjustment lengthwise of said tracks, said movable track including a side portion pivoted to said block whereby the end of the movable track may be lifted by the roller from its position of rest on the upper fixed track section when the roller has traveled up said inclined track section, and means for horizontally adjusting said block and thereby varying said drop-off point.

AUGUST E. HEIN.

REFERENCES CITED

The following references are of record in the file of this patent:

UNITED STATES PATENTS

| Number    | Name   | Date          |
|-----------|--------|---------------|
| 911,851   | Tucker | Feb. 9, 1909  |
| 970,370   | Green  | Sept. 13, 1910 |
| 2,488,046 | Werner | Nov. 15, 1949 |